F. B. TOWNSEND.
HANDLE ATTACHING MACHINE FOR BASKETS AND ANALOGOUS RECEPTACLES.
APPLICATION FILED APR. 17, 1914.
1,133,201.
Patented Mar. 23, 1915.
3 SHEETS—SHEET 1.
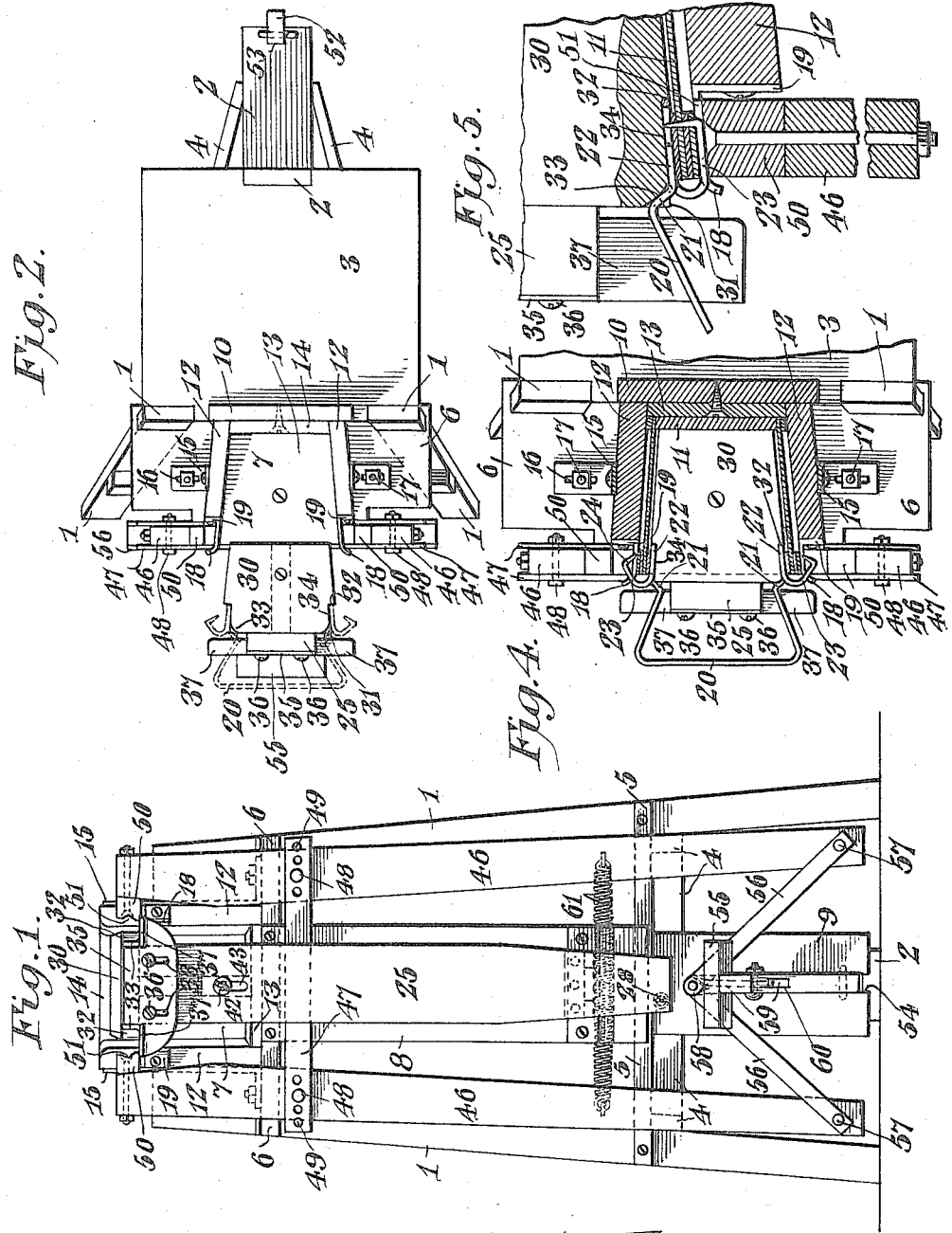
Frank B. Townsend, INVENTOR
WITNESSES
BY
ATTORNEY F. B. TOWNSEND.
HANDLE ATTACHING MACHINE FOR BASKETS AND ANALOGOUS RECEPTACLES.
APPLICATION FILED APR. 17, 1914.
1,133,201.
Patented Mar. 23, 1915.
3 SHEETS—SHEET 2.
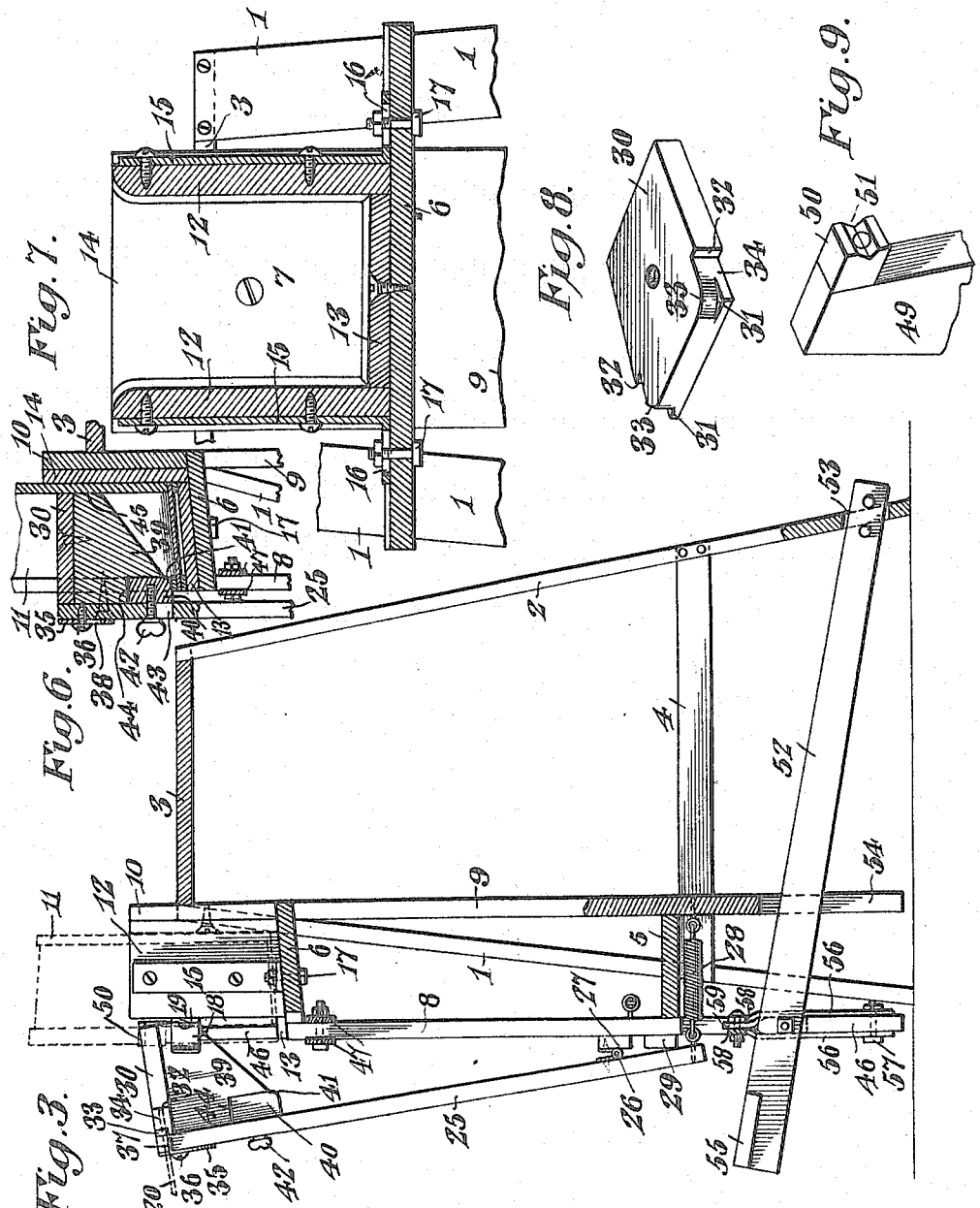
Frank B. Townsend, INVENTOR
WITNESSES
BY
ATTORNEY

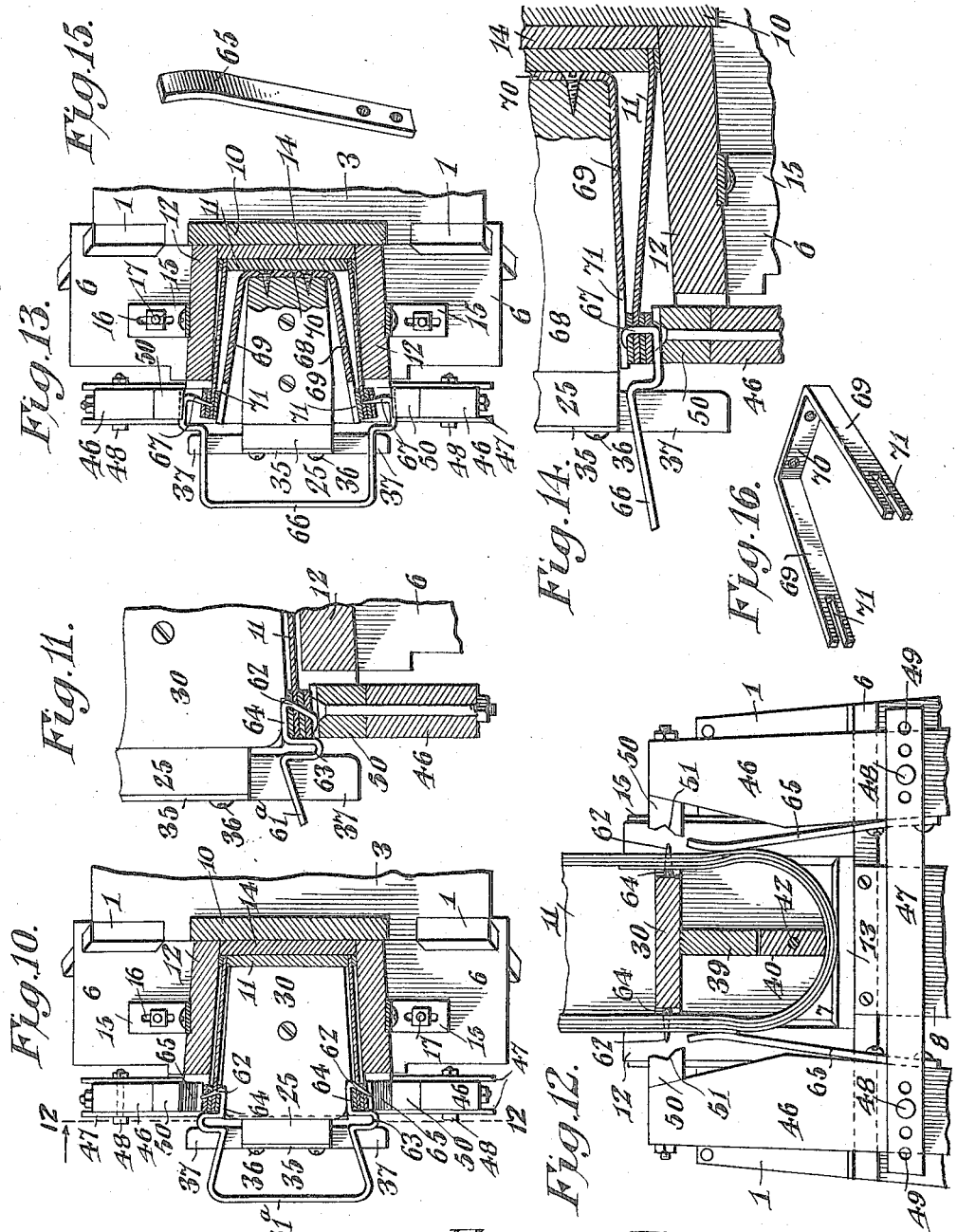

UNITED STATES PATENT OFFICE.

FRANK BOGART TOWNSEND, OF PENN YAN, NEW YORK, ASSIGNOR OF ONE-HALF TO JOHN E. McMATH, OF PENN YAN, NEW YORK.

HANDLE-ATTACHING MACHINE FOR BASKETS AND ANALOGOUS RECEPTACLES.

1,133,201.  Specification of Letters Patent.  Patented Mar. 23, 1915.

Application filed April 17, 1914. Serial No. 832,550.

*To all whom it may concern:*

Be it known that I, FRANK B. TOWNSEND, a citizen of the United States, residing at Penn Yan, in the county of Yates and State of New York, have invented a new and useful Handle-Attaching Machine for Baskets and Analogous Receptacles, of which the following is a specification.

The invention relates to a handle-attaching machine for baskets and analogous receptacles.

The object of the present invention is to provide a simple, practical, and efficient machine, of comparatively inexpensive construction, adapted to enable completed wire handles to be easily and quickly applied to baskets and analogous receptacles without requiring skilled labor in its manipulation, and capable of adjustment to accommodate baskets of different sizes and to center the handles with respect to the baskets.

A further object of the invention is to provide a machine of this character adapted to hold a basket or analogous receptacle in position to receive a handle and capable of enabling handles which ordinarily have to be hooked into the sides of a basket previous to clenching the same, to be attached with a single movement, causing a preliminary piercing of the sides of the basket and a final compression and clenching of the attaching portions of the handle against the sides of the basket.

With these and other objects in view the invention consists in the construction and novel combination of parts hereinafter fully described, illustrated in the accompanying drawings, and pointed out in the claims hereto appended, it being understood that various changes in the form, size, proportion and minor details of construction, within the scope of the claims, may be resorted to without departing from the spirit or sacrificing any of the advantages of the invention.

In the drawings:—Figure 1 is a front elevation of a handle attaching machine constructed in accordance with this invention. Fig. 2 is a plan view of the same. Fig. 3 is a vertical longitudinal sectional view, the basket supporting box and the handle carrying lever being shown in elevation. Fig. 4 is a horizontal sectional view of the front portion of the machine, the handle carrying member being swung inwardly and the terminal attaching portions or clamps of the handle being in position to be engaged by the pressure applying levers. Fig. 5 is an enlarged horizontal sectional view of one side of the machine, illustrating the arrangement of the parts after pressure has been applied and the handle secured to the basket. Fig. 6 is a detail sectional view taken centrally through the upper portion of the front of the machine, illustrating the manner of clamping a basket in position to receive a wire handle. Fig. 7 is an enlarged transverse sectional view through the support or box. Fig. 8 is a detail perspective view of the head of the handle carrying lever. Fig. 9 is a detail perspective view of the upper end of one of the transverse pressure applying levers. Fig. 10 is a horizontal sectional view of the front portion of a handle attaching machine, illustrating another form of the invention. Fig. 11 is an enlarged detail sectional view illustrating the arrangement of the parts after the pressure has been applied and the attaching portion of the handle clenched against the sides of the basket. Fig. 12 is a transverse sectional view on the line 12—12 of Fig. 10. Fig. 13 is a horizontal sectional view of the front portion of a handle attaching machine showing still another form of the invention. Fig. 14 is an enlarged sectional view of one side of the same illustrating the arrangement of the parts after the pressure has been applied and the handle clenched. Fig. 15 is a detail view of one of the upright springs for yieldably engaging the basket to cause a preliminary piercing of the same prior to the clenching operation. Fig. 16 is a detail view of the horizontal spring which yieldably supports the sides of the basket while the sides are pierced prior to the clenching operation.

Like numerals of reference designate corresponding parts in all the figures of the drawings.

In the accompanying drawings, in which is illustrated the preferred embodiment of the invention, the frame of the machine, which may be constructed in any preferred manner, preferably comprises, in its construction, a pair of rearwardly inclined front legs 1, a forwardly inclined central rear leg 2, an approximately rectangular table or top 3, and lower rearwardly converging side bars 4, suitably secured to the front and rear legs. The front legs are connected with each other by a front transverse bar or member 5, arranged upon and secured to the front portions of the side bars and recessed at its terminals to receive the front legs and suitably secured to the same. The frame is also provided at the front with an upper transverse shelf 6, extending entirely across the front of the frame and constituting the bottom of a basket support or box 7. The transverse shelf or member 6, which is arranged at a slight inclination, as clearly shown in Fig. 3 of the drawings, is supported at the front edge by a central front vertical bar or member 8, and it is recessed at the back to receive the front legs 1 and is suitably secured to the same and to an intermediate vertical bar or member 9, located in rear of the front supporting bar or member 8 and constituting the back or rear wall 10 of the basket holder or box 7. The intermediate vertical bar or member is suitably secured to the lower transverse bar 5 and to the top or table of the frame.

The inclination of the shelf 6 corresponds with the taper of the ends of the basket 11, and the basket receiving box or holder consists of the bottom 7, the rear wall 10, and forwardly diverging side walls 12, adjustably mounted upon the transverse shelf 6 and adapted to be moved toward and from each other to vary the width of the basket receiving box or holder. The bottom and the back of the basket holder or box are provided with removable filling plates or pieces 13 and 14, adapted to be detached to increase the size of the box or holder to accommodate a larger basket. Screws or any other suitable fastening means may be employed for fastening the filling pieces 13 and 14 to the bottom and back of the box or holder. The basket receiving box or holder is open at the top and front and the basket 11 is arranged within the box or holder, resting upon one end with its open top to the front. The side walls 12 are adjustably mounted on the shelf 6 by angle plates or knees 15, each having one of its sides or wings bolted or otherwise secured to the outer face of the adjacent side wall of the box or holder, and provided in its other side or wing with a slot 16 for the reception of a bolt 17 or other fastening device for securing the slotted side or wing to the upper face of the shelf 6. The sides or wings, which are attached to the side walls 12, preferably extend to the upper edges of the same, as clearly shown in Fig. 3 of the drawings. Any other suitable means, however, may be employed for adjustably mounting the sides of the box or holder. The sides of the box or holder 12 are provided at their front edges with horizontally disposed forwardly diverging resilient guiding arms 18, having laterally curved terminals, as clearly shown in Fig. 2 of the drawings. These resilient guiding arms assist in introducing baskets into the box or holder. The resilient guiding arms have attaching flanges 19, which are suitably secured to the front edges of the side walls. By this construction and arrangement, the basket holder or box being open at the top and front, baskets may be quickly and accurately placed therein in position to receive a wire handle 20, and may be rapidly removed from the box or holder after the handles have been attached to them.

The present machine is designed principally for applying the wire handle forming the subject-matter of an application filed by me on the 31st day of March, 1914, Serial No. 828,641. At the same time, it is capable of applying similar handles to baskets, as hereinafter fully described. The handle 20, which is constructed of a single piece of wire, is approximately U-shaped, being composed of a transverse grip portion and converging sides provided at their lower or outer ends with lateral bends 21 and having integral clamps including loops 22 and coacting sides or jaws 23. The loops are connected at one side with the bends 21, and the sides or jaws, which are connected with the other side of the loops, are provided with transversely disposed inwardly extending terminal prongs 24, which pierce the sides of the basket. The clamps of the wire handle are open and have their sides or jaws arranged at an acute angle to their loops, as illustrated in dotted lines in Fig. 2 of the drawings, and in full lines in Fig. 4 of the drawings, prior to applying pressure to the clamps for securing the same to the sides of the basket.

The wire handle 20 is placed on and is supported by a lever 25, which is oscillated to carry the handle to the basket with its clamps in position for engaging the sides of the said basket. The lever, which is mounted at the front of the machine, is normally arranged at an inclination, and it extends upwardly and forwardly from the lower portion of the front vertical bar or member 8, being connected therewith by a hinge 26 or other suitable means for fulcruming the lever. The hinge 26, which forms a convenient means for mounting the lever, has one of its leaves secured to the inner or rear face of the lever, and its other leaf is fastened to a block 27 arranged at the outer face of the front bar or member 8. The hinge 26 is located near the lower end of the lever 25, which projects below the said hinge to form a short lower arm, and a coiled spring 28, which is secured at its rear end to the intermediate vertical bar 9, is connected at its front end to the lower terminal of the lever 25 for urging the upper end of the lever forwardly or outwardly. The front vertical bar or member 8 is also provided with a block 29, which forms a stop for limiting the rearward swing of the lower arm of the lever 25. The lever 25, which is swung rearwardly by hand, is equipped at its upper end with a rearwardly extending head or plunger 30 and a handle support. The head or plunger 30, which may be constructed of any suitable material, is tapered rearwardly to enable it to readily pass between the sides of the basket, and its front end projects laterally from the side edges of the lever 25 and is recessed to form lower horizontal supporting shoulders 31 and rear vertical guard shoulders 32. The front corners of the block are rounded at 33 above the horizontal supporting shoulders 31, and are adapted to receive the lateral bends 21 of the wire handle, and they permit a limited vertical adjustment of the handle to center the same with relation to the basket. The loops of the clamps fit in the side recesses 34 of the head or plunger 30 and fit against the guard shoulder 32, which prevents the said loops from coming in contact with the sides of the basket and becoming displaced by the same when the head or plunger moves into the basket in carrying the handle thereto.

The handle support 35 consists of a plate secured to the outer or front face of the lever 25 by screws 36 or other suitable fastening devices, and extending laterally beyond the side edges of the lever 25 and provided at the laterally projecting portions with integral supporting flanges 37 adapted to receive the sides of the wire handle. The screws 36 extend through slots 38 of the handle support, which is adapted to be raised and lowered to position the wire handle properly with relation to the basket. The supporting flanges 37, which are arranged in a horizontal position when the lever is vertical, extend rearwardly from the laterally projecting portions of the handle support and are located at the side edges of the handle carrying lever. The resiliency of the wire handle enables it to yieldably embrace the head or plunger 30 and maintain itself in engagement with the same until it is clamped around the sides of the basket. The flanges 37 support the sides of the handle in advance of the shoulders 31, so that there is no liability of the sides of the handles tilting or tipping and thereby becoming displaced through gravity. The side faces of the head or plunger form clenching faces, and the said head or plunger operates in the nature of a die in the clamping and clenching of the handle on the sides of the basket. The head or plunger, which may be secured to the upper end of the lever 25 in any desired manner, is preferably supported by a brace 39 secured to the rear face of the lever and to the lower face of the head or plunger, and arranged beneath the latter.

When the head or plunger is moved rearwardly into the basket, the latter is engaged at the bottom by a clamping member 40, which engages the inner face of the lower end of the basket and firmly holds the latter in the box while the handle is being applied. The clamping member 40 consists of a block or piece provided with a rounded lower rear corner 41 and adjustably secured to the lever 25 by a thumb screw 42, engaging a threaded bore or opening in the clamping member and operating in a vertical slot 43 of the lever 25. The brace is provided at its front edge with a lower recess 44 to receive the clamping block or member, and is preferably provided with an inclined lower edge to clear the lower end of the basket, the block and the vertical rear edge 45 coinciding with the rear end of the head or plunger, and it is adapted to coact with the latter in engaging the bottom of the basket to hold the same firmly against the rear wall of the basket. It is not essential that the head or plunger extend to and engage the bottom of the basket, as the clamping of the end of the basket against the bottom of the box or holder will maintain the basket firmly in position to receive the wire handle.

The sides or jaws of the terminal clamps of the wire handle are bent inwardly against the outer face of the sides of the basket by a pair of levers 46, arranged in substantially an upright position and adjustably mounted between spaced arms 47 by bolts 48. The arms 47, which support the levers 46, consist of bars secured to the front and rear faces of the front vertical bar or member 8 and projecting laterally therefrom. The terminal portions of the horizontal bars or members form the arms 47, and are provided with perforations 49, arranged at intervals and adapted to permit the pivot bolts 48 of the levers 46 to be adjusted inwardly and outwardly to arrange the levers in proper position for exerting the desired clamping action on the terminal clamps or fastening means of the wire handles. The levers 46, which are fulcrumed intermediate of their ends, have short upwardly extending arms which are provided at their inner edges with jaws 50, constituting dies and providing inner engaging faces or edges with substantially V-shaped grooves 51 adapted to engage and center the sides or jaws of the clamps of the wire handle, whereby the said clamps are prevented from slipping off the engaging portions of the pressure applying levers. The upper arms of the levers 46 swing transversely of the machine, and their relatively long lower arms are forced outwardly by means of a treadle 52, extending longitudinally of the machine at the bottom of the frame and fulcrumed at its rear end in a slot 53 of the rear leg of the frame. The treadle 52 extends through and is guided by a slot or bifurcation 54 in the lower portion of the intermediate vertical bar or member of the frame, and its front or outer portion extends between the lower arms of the levers 46 and is provided with a foot plate 55 adapted to be depressed by the foot of the operator. The front portion of the treadle 52 is connected with the lower ends of the levers 46 by toggle links 56 arranged at an inclination and converging upwardly, as clearly shown in Fig. 1 of the drawings, when the levers 46 are in their normal position. The links 56, which are arranged in pairs, are pivoted at their lower ends 57 to the lower terminals of the levers 46, and their upper terminals 58 are pivotally connected with each other and to a link plate 59, which is pivoted to the treadle in a slot or recess 60 thereof. When the treadle is depressed, the lower arms of the levers 46 are spread or forced outwardly, and the upper arms are moved inwardly into engagement with the terminal clamps of the wire handle. When the treadle is released, the levers 46 are returned to their initial position by a transversely disposed coiled spring 61, connected at its terminals to the lower arms of the levers 46 and extending across the rear face of the front vertical bar or member 8. The parts are preferably so proportioned that the floor or other supporting surface will limit the downward movement of the treadle prior to the toggle links 56 assuming a horizontal position, so that the links 56 will not operate as a lock and hold the lower arms of the levers 46 in a spread condition. After the pressure has been applied to the terminal clamps of the wire handle, the spring 61 opens the outer arms of the levers 46, and the spring 28 swings the lever 25 forwardly or outwardly, carrying with it both the handle and the basket, which may be rapidly removed from the head or plunger.

In Figs. 10 to 12 inclusive is illustrated a form of the invention designed for applying the Meney wire handle 61$^a$ or a similar wire handle having outwardly extending transversely disposed points or prongs 62 adapted to pierce the sides of a basket from the interior, and to be clenched against the exterior of the basket in the manner shown in Fig. 11 of the drawings. The wire handle 61$^a$, which is approximately U-shaped, consists of a single piece of wire and is composed of a transverse grip or handle portion and converging sides, provided at their terminals with laterally extending approximately U-shaped loops 63 and with substantially L-shaped portions 64. The L-shaped portions 64 form the terminal prongs 62 and provide connecting portions extending from the prongs to the loops, and adapted to fit against the inner hoops of the basket. In this form of the invention, the power applying levers are equipped at their upper arms with springs 65 secured at their lower ends to the said power applying levers at the inner edges thereof, and having free upper terminals normally spaced from the power applying levers and adapted, when the upper arms thereof are moved inwardly to engage the sides of the basket, to force the same inwardly, thereby causing the transversely disposed terminal prongs 62 of the handle 61$^a$ to pierce the sides of the basket. The springs are of sufficient strength to flex the sides of the basket and cause the same to be pierced by the terminal prongs 62. This is effected before the jaws of the levers engage the sides of the basket and the terminal portions of the prongs 62. The continued inward movement of the upper arms of the power applying levers carries the jaws thereof into engagement with the said terminal prongs, which are clenched against the exterior of the sides of the basket.

When the machine is to be employed for applying the Keney wire handle 66, or a similar wire handle having inwardly extending transversely disposed terminal prongs 67, (see Figs. 13, 14, and 16) a head or plunger 68 having a spring 69 is used in connection with the transversely movable power applying levers. The spring 69, which is approximately U-shaped, consists of spaced sides and a connecting portion 70, which is secured to the inner or lower edge of the head or plunger 68. The sides normally diverge forwardly and are arranged at an acute angle to the side edges or faces of the head or plunger 68, and they form yieldable supports or abutments for the sides of the basket and enable the terminal prongs to be forced through the sides of the basket by the power applying levers. The continued movement of the power applying levers forces the sides of the basket and the springs inwardly and upsets and clenches the terminal prongs into engagement with the side edges or faces of the head or plunger 68. The free terminals of the sides of the spring 69 are provided with slots or bifurcations 71, through which the prongs 67 extend. The spring 65 and the head 68, with its spring 69, may be in the form of attachments to adapt the machine for operating on various kinds of wire handles.

What is claimed is:

1. A handle attaching machine including receptacle holding means, a handle support provided with means for receiving a wire handle and movable into and out of the receptacle to prevent the terminal portions of the handle to the opposite walls of the receptacle and to form an inner die against which the handle is clenched, and pressure applying means operating exteriorly of the receptacle and coacting with the die of the handle support to force the terminal portions of the handle into engagement with the basket.

2. A handle attaching machine comprising a receptacle holding means, a handle support of a size to receive and to be yieldably embraced by a completed wire handle and to extend into the receptacle to form an inner die, and means operating exteriorly of the receptacle and coacting with the die of the handle support for forcing the terminal portions of the handle into engagement with the receptacle.

3. A handle attaching machine comprising a receptacle holding means, a handle support provided with means for receiving a completed wire handle and being of a size to extend into the receptacle to form an inner die, and pressure applying levers operating exteriorly of the receptacle and coacting with the die for forcing the handle into engagement with the receptacle.

4. A handle attaching machine including a relatively fixed receptacle holder consisting of a box open at the front and top, a handle support having means for receiving a completed wire handle and movable into and out of the receptacle and adapted to hold the terminals of the handle in position for engaging the opposite walls of the receptacle, said handle support forming an inner die, and pressure applying means located at opposite sides of the receptacle holder and coacting with the die of the handle support for forcing the terminal portions of the handle into engagement with the receptacle.

5. A handle attaching machine including a box open at the front and top and adapted to receive a receptacle, said box being provided with means for adjusting it to accommodate receptacles of different sizes, a handle support having means for receiving a completed wire handle for adjusting the same to center the wire handle with respect to the receptacle, said handle support being of a size to extend into the receptacle to form an inner die, and pressure applying means coöperating with the die of the handle support for forcing the terminal portions of the handle into engagement with the opposite walls of the receptacle.

6. A handle attaching machine including a frame provided with a box open at the front and top and adapted to hold a receptacle with its open top to the front, a handle support located in advance of the said box and provided with means for receiving a wire handle and movable to and from the box to carry the terminals of the handle to the opposite walls of the receptacle, and pressure applying means located at opposite sides of the box and coöperating with the handle support for forcing the terminal portions of the handle into engagement with the receptacle.

7. A handle attaching machine including a receptacle holder consisting of a box open at the front and provided at opposite sides with outwardly diverging resilient guiding arms, handle supporting means movable to and from the receptacle holder and adapted to support a wire handle, and pressure applying means operating at opposite sides of the receptacle holder for forcing the wire handle into engagement with the receptacle.

8. A handle attaching machine including a frame provided with a relatively fixed receptacle holder consisting of a box open at the front and top and adapted to receive a completed receptacle, a handle support located in advance of the receptacle holder and provided with means for receiving a completed wire handle and movable to and from the said receptacle holder, said handle support being of a size to extend into the receptacle and form an inner die, and pressure applying levers having engaging portions located at opposite sides of the receptacle holder and coacting with the inner die of the handle support for forcing the handle into engagement with the receptacle.

9. A handle attaching machine including a frame having a receptacle holder adapted to support a receptacle with its open top to the front, a handle carrying lever located in advance of the receptacle holder and provided with means for receiving a wire handle and movable to and from the receptacle holder, and pressure applying means located at opposite sides of the holder for forcing the terminal portions of the handle into engagement with the receptacle.

10. A handle attaching machine comprising a frame having receptacle holding means, an oscillatory handle carrying lever having means for receiving a wire handle and including a head or plunger movable to and from the receptacle holding means and constituting a die, and a pair of pressure applying levers having jaws located at opposite sides of the receptacle holding means and coöperating with the head or plunger for forcing the terminal portions of the handle into engagement with the receptacle.

11. A handle attaching machine comprising a frame provided with receptacle holding means, an oscillatory handle carrying lever located in advance of the receptacle holding means and movable to and from the same and provided with means for receiving a wire handle, said lever including a plunger movable into and out of the receptacle, upright pressure applying levers located at opposite sides of the receptacle holder and fulcrumed at a point intermediate of their ends, the upper arms of the levers being provided with means coacting with the head or plunger for forcing the wire handle into engagement with the receptacle, and operating means connected with the lower arms of the pressure applying levers.

12. A handle attaching machine including a frame provided with receptacle holding means adapted to hold a receptacle with its open top to the front, an oscillatory handle carrying lever movable to and from the receptacle holding means and provided with means for engaging and clamping the receptacle, said lever being also provided with means for receiving a wire handle, and pressure applying means arranged to force the terminal portions of the wire handle into engagement with the receptacle.

13. A handle attaching machine including a frame provided with receptacle holding means adapted to hold a receptacle with its open top to the front, an oscillatory handle carrying lever movable to and from the receptacle holding means and provided with means for receiving a wire handle, a clamping member carried by the said lever and arranged to engage the receptacle at the bottom of the receptacle holding means for gripping the receptacle, and pressure applying means arranged at opposite sides of the receptacle holding means for forcing the terminal portions of the handle into engagement with the basket.

14. A handle attaching machine including a frame having receptacle holding means, an oscillatory lever movable to and from the receptacle holding means and including a head or plunger adapted to extend into the receptacle, said head or plunger being provided at opposite sides with means for supporting the terminals of a wire handle, a clamping member carried by the said lever and arranged to grip the said receptacle, and pressure applying means located at opposite sides of the receptacle holding means for forcing the terminal portions of the handle into engagement with the receptacle.

15. A handle attaching machine including a frame having receptacle holding means, an oscillatory handle carrying lever movable to and from the receptacle holding means and provided with a plunger or head adapted to extend into the receptacle and provided at opposite sides with supporting shoulders and having upwardly extending guard shoulders located in advance of the supporting shoulders and adapted to prevent the handle from being displaced, and pressure applying means located at opposite sides of the receptacle holding means for forcing the terminal portions of the wire handle into engagement with the receptacle.

16. A handle attaching machine including a frame having receptacle holding means, an oscillatory lever movable to and from the receptacle holding means and provided with a head or plunger arranged to extend into the receptacle and adapted to receive the terminal portions of the wire handle, and a handle support adjustably mounted on the lever and provided at opposite sides thereof with supporting flanges arranged to receive the sides of the handle, and pressure applying means coacting with the head or plunger for forcing the terminal portions of the handle into engagement with the receptacle.

17. A handle attaching machine including a frame having receptacle holding means, an oscillatory handle carrying lever movable to and from the receptacle holding means and provided with a head or plunger adapted to extend into the receptacle, and pressure applying means located at opposite sides of the receptacle holding means and provided with jaws having approximately V-shaped grooves arranged to engage the terminal portions of the wire handle and adapted to prevent the same from slipping.

18. A handle attaching machine including a frame provided with a receptacle holding box open at the top and front, an oscillatory handle carrying lever located in advance of and movable to and from the basket holding box, said lever being fulcrumed at an intermediate point and forming upper and lower arms and being provided with a plunger arranged to extend into the receptacle, a spring connected with the lower arm for carrying the lever away from the receptacle holding box, and pressure applying means coacting with the plunger for forcing the terminals of the handle into engagement with the receptacle.

19. A handle attaching machine including a frame provided with a receptacle receiving box open at the front, a handle supporting means movable to and from the receptacle receiving box, upright pressure applying levers arranged at opposite sides of the said box and fulcrumed at an intermediate point to form upper and lower arms, the upper arms being arranged to force the terminal portions of the wire handle into engagement with the receptacle, links extending upwardly and inwardly from the lower arms of the levers, and a treadle extending between the lower arms of the levers and connected with the upper ends of the links.

20. A handle attaching machine including receptacle holding means, a handle support movable to and from the receptacle holding means and provided with means for receiving a wire handle, and pressure applying levers located at opposite sides of the receptacle holding means and provided with prongs having free portions forming yieldable means for engaging the sides of the receptacle to cause a preliminary piercing of the latter.

21. A handle attaching machine including receptacle holding means, a handle support movable to and from the receptacle holding means and including a head or plunger adapted to extend into the receptacle and provided at opposite sides with yieldable abutments arranged to engage the sides of the receptacle to permit a preliminary piercing of the same, and pressure applying means located at opposite sides of the receptacle holding means.

22. A handle attaching machine including receptacle holding means, a handle support movable to and from the receptacle holding means and including a head or plunger adapted to extend into the receptacle and provided at opposite sides with yieldable abutments and free spring portions located at opposite sides of the head or plunger and extending along the same in position for engaging the interior of a receptacle at opposite sides thereof and provided with openings, and pressure applying means arranged to engage the receptacle exteriorly thereof.

23. A handle attaching machine comprising receptacle holding means, a handle support provided with means for receiving a completed handle and being of a size to extend into the receptacle to form an inner die, and means operating exteriorly of the receptacle and coacting with the said inner die for forcing the handle into engagement with the receptacle.

In testimony, that I claim the foregoing as my own, I have hereto affixed my signature in the presence of two witnesses.

FRANK BOGART TOWNSEND.

Witnesses:
F. M. McNiffwit,
J. E. McMath.

Copies of this patent may be obtained for five cents each, by addressing the "Commissioner of Patents, Washington, D. C."